United States Patent Office 3,432,266
Patented Mar. 11, 1969

3,432,266
PROCESS FOR THE PRODUCTION OF CARBON OXYSULPHIDE
Robert Garlet and Louis Grandet, Toulouse, France, assignors to Office National Industriel de l'Azote, Toulouse, France
No Drawing. Filed May 27, 1965, Ser. No. 459,432
Claims priority, application France, May 27, 1964, 4,979
U.S. Cl. 23—203      5 Claims
Int. Cl. C01b 31/26

ABSTRACT OF THE DISCLOSURE

Carbon oxysulfide (COS) is produced with high efficiency at relatively low temperatures (200° to 500° C.) by reacting carbon dioxide and carbon disulfide with the aid of a contact mass consisting essentially of magnesia having a density of about 2.0 to 2.5, in the absence or presence of catalytic vanadium oxide or thorium oxide for further accelerating the reaction rate, and separating unreacted $CS_2$ from the resultant COS. Cyclic operation and methods of preparing and regenerating the contact mass are also disclosed.

---

The present invention relates to an improved process for the production of carbon oxysulphide.

The commercial processes for the production of carbon oxysulphide generally involve reacting carbon dioxide with sulfur, as such or preferably in the form of hydrogen sulfide. Although the starting materials employed in such processes are abundant and inexpensive, the reactions are of low efficiency, of the order of 3% to 4%, which entails serious difficulties in the separation of the oxysulphide produced, particularly where the equilibrium reaction:

$$CO_2 + H_2S \rightleftarrows COS + H_2O \tag{1}$$

is employed. The water liberated in this reaction is, in particular, troublesome, and steps must be taken to remove it as rapidly as it is liberated, use being made to this end of a dehydrating agent, and this is a complicating factor since the dehydrating capacity of such agent is quickly exhausted. Moreover, the use of high temperatures and pressures is indicated.

The present invention is concerned with the production of carbon oxysulphide by a process which does not include the liberation of water in the course of the reaction, and thus is performed under substantially anhydrous conditions, free of the disadvantages of the precedingly described process. The process employed according to the present invention involves the following reaction:

$$CO_2 + CS_2 \rightleftarrows 2COS \tag{2}$$

It has been found, according to this invention, that the requirement of reaction (2) for the more expensive carbon disulfide instead of the cheap hydrogen sulfide employed in reaction (1), is more than offset by the high efficiency at which the reaction (2) proceeds when carried out in accordance with the present invention. Since reaction (2) gives oxysulphide yields of 30% to 35% when carried out at the low temperatures (200° C. to 500° C.) made possible by this invention, a very high reaction rate is achieved, while keeping thermal decomposition of carbon oxysulphide down to a minimum.

Briefly stated, the objective of the present invention is achieved by carrying out reaction (2) in the presence of a specially prepared contact mass consisting essentially of magnesia, as hereinafter characterized, with or without a catalytic amount of vanadium oxide or thorium oxide, which have a favorable effect in that they accelerate the reaction rate at the moderate temperatures employed.

It has been found that magnesia is the only metal oxide that, in the presence of a sulfurization agent, yields carbon oxysulfide according to the equation $$CS_2 + MgO \rightarrow COS + MgS \tag{3}$$

whereas practically all the metal oxides lead to the formation of metal sulfides, according to the equation $$2MO + CS_2 \rightarrow CO_2 + 2MS \tag{4}$$

It has further been found that by operating in the presence of carbon dioxide, magnesium oxide is formed according to the equation $$CO_2 + MgS \rightarrow COS + MgO \tag{5}$$

Accordingly the process of the present invention can be put into practice continuously or cyclically, reactions (3) and (5) taking place simultaneously or in succession on contact with the magnesium mass.

The activity of this mass decreases more or less rapidly as the efficiency of reaction (5) is markedly lower than that of reaction (3).

According to the process of the present invention, it is possible to periodically regenerate said mass in situ with water vapor at the same temperature as that fixed for the reaction proper. Magnesium sulfide is then hydrolyzed according to the equation $$MgS + H_2O \rightarrow MgO + H_2S \tag{6}$$

The invention is also concerned with the preparation of an active contact mass which is easily regenerable and has excellent mechanical strength.

The contact mass employed according to the present invention is prepared by kneading light magnesia (density 2.0 to 2.5), resulting from low temperature (600° to 700° C.) calcination of natural magnesium carbonate or magnesium hydrocarbonate, with a restricted amount of water, with or without the addition of ammonium bicarbonate or ammonium oxalate. After kneading for some time in the pasty phase, the product is shaped and dried.

The light magnesia may be admixed with 1% to 5% by weight thereof of a decomposable salt of vanadium and/or of a decomposable salt of thorium, such for example as ammonium vanadate and thorium oxalate, which upon decomposition yield the corresponding vanadium oxide or thorium oxide.

The formed and dried product may be submitted to calcination at moderate temperature (400° to 500 °C.), if desired.

Carbon oxysulphide is useful in the manufacture of urea in per se known manner.

The following examples set forth presently preferred exemplary embodiments of this invention. Percentages are by weight.

EXAMPLE 1

A contact mass is obtained by kneading in the pasty phase 100 kilograms of light magnesia (density 2.3) with 42 liters of water, for about half an hour at room temperature (20° to 30° C.). The mass is formed into cylindrical rolls in an extruding machine and dried in the air. The granules then contain 67% of MgO and 33% of $MgO \cdot H_2O$, i.e. 10.2% of water eliminable by heating.

The mass is used for the cyclic manufacture of carbon oxysulphide at about 450° C. in two steps.

In the first step of the cycle, for about 2 minutes, carbon disulphide, vaporized and preheated by heat exchange with the gaseous products from the reaction furnace, is passed into contact with the contact mass. By using a space velocity of 250 volumes per hour of vaporized carbon disulphide per volume of contact mass, there are obtained, per step, 7.46 volumes of gaseous reaction products from which 4.70 volumes of unreacted $CS_2$ are condensed out, adsorbed on activated carbon and recycled to the initial system. The final product is thus constituted by 2.7 volumes per step of a gas containing 80% of COS, 17% of $CO_2$ and 3% of $(CO+H_2S)$.

During the second step of the cycle, i.e., 3 minutes, a flow of carbon dioxide preheated by heat exchange with the gaseous products from the reaction furnace is passed into contact with the mass. At a space velocity per hour of 125 volumes of carbon dioxide per volume of contact mass, there are obtained per step 6.30 volumes of a gas containing 45% of COS, 5% of $(CO+H_2S)$ and 50% of unreacted $CO_2$.

The products of the first and second steps of the cycle may be mixed and carbon oxysulphide can be extracted by conventional means such as low-temperature condensation.

It may be, however, particularly advantageous to treat separately the gaseous products from the first step of the cycle in view of separating practically pure carbon oxysulphide.

Regeneration of the contact mass is carried out after 24 hours by passing water vapor therethrough at 450° C. for an hour.

EXAMPLE 2

A contact mass is prepared by kneading with 50 liters of water, at room temperature, 100 kilograms of light magnesia (density 2.3), 5 kilograms of ammonium vanadate $VO_3$ and 3 kilograms of ammonium bicarbonate. After an hour's kneading in the pasty phase, shaping, drying and calcining in the reaction furnace itself at 400° C. for half an hour, carbon oxysulphide is then continuously produced by passing into the furnace a suitably preheated gaseous mixture containing 40% of carbon dioxide and 60% of carbon disulphide.

At a reaction temperature of 400° C. and a space velocity of 200 volumes per hour of gaseous mixture per volume of active mass, there are obtained 197 volumes per hour of a gaseous product containing 300% of unreacted carbon disulphide which is recycled after separation, and the final product contains 70% of COS, 25% of $CO_2$ and 5% of $(CO+H_2S)$.

The efficiency of the operation gradually decreases as the amount of unreacted carbon sulphide increases in the reaction products. Although the product can be easily recycled to the process, the activity of the mass decreases as magnesia is gradually transformed into magnesium sulphide. After 24 hours' operation, the contact mass is regenerated with water vapor at 400° C. for 90 minutes.

Having thus disclosed the invention, what is claimed is:

1. A process for the production of carbon oxysulphide by the reaction of carbon dioxide and carbon disulphide which comprises bringing the carbon dioxide and the carbon disulphide into contact with a contact mass consisting essentially of magnesium oxide having a density of 2.0 to 2.5 under substantially anhydrous conditions at a temperature of 200° C. to 500° C., whereby thermal decomposition of formed COS is essentially minimized, and recovering the COS from the resultant reaction products.

2. A process for the production of carbon oxysulphide by the reaction of carbon dioxide and carbon disulphide which comprises bringing the carbon dioxide and the carbon disulphide into contact with a contact mass consisting essentially of magnesium oxide having a density of 2.3 under substantially anhydrous conditions at a temperature of 200° C. to 500° C., whereby thermal decomposition of formed COS is essentially minimized, and recovering the COS from the resultant reaction products.

3. A process for the production of carbon oxysulphide by the reaction of carbon dioxide and carbon disulphide which comprises bringing the carbon dioxide and the carbon disulphide into contact with a contact mass consisting of a major proportion of magnesium oxide having a density of about 2.3 and a minor proportion of a member selected from the group consisting of vanadium oxide and thorium oxide, under substantially anhydrous conditions at a temperature of 200° C. to 500° C., whereby thermal decomposition of formed COS is essentially minimized, and recovering the COS from the resultant reaction products.

4. A process for the production of carbon oxysulphide by the reaction of carbon dioxide and carbon disulphide which comprises bringing the carbon dioxide and the carbon disulphide into contact with a contact mass consisting of a major proportion of magnesium oxide having a density of about 2.0 to 2.5 and a minor proportion of a member selected from the group consisting of vanadium oxide and thorium oxide, under substantially anhydrous conditions at a temperature of 200° C. to 500° C., whereby thermal decomposition of formed COS is essentially minimized, and recovering the COS from the resultant reaction products.

5. A process according to claim 1, wherein the reaction is carried out in continuous manner, regeneration of inactivated contact mass to the active state being periodically effected in situ by the action thereon of water vapor at a temperature corresponding to the temperature at which the COS forming reaction is carried out.

References Cited

FOREIGN PATENTS 1,124,925   7/1956   France.

EARL C. THOMAS, Primary Examiner.

B. H. LEVENSON, Assistant Examiner.

U.S. Cl. X.R.

23—134